Dec. 4, 1923.
L. P. MOOERS
1,476,675
POWER TRANSMITTING MECHANISM
Filed July 12, 1920      4 Sheets-Sheet 1
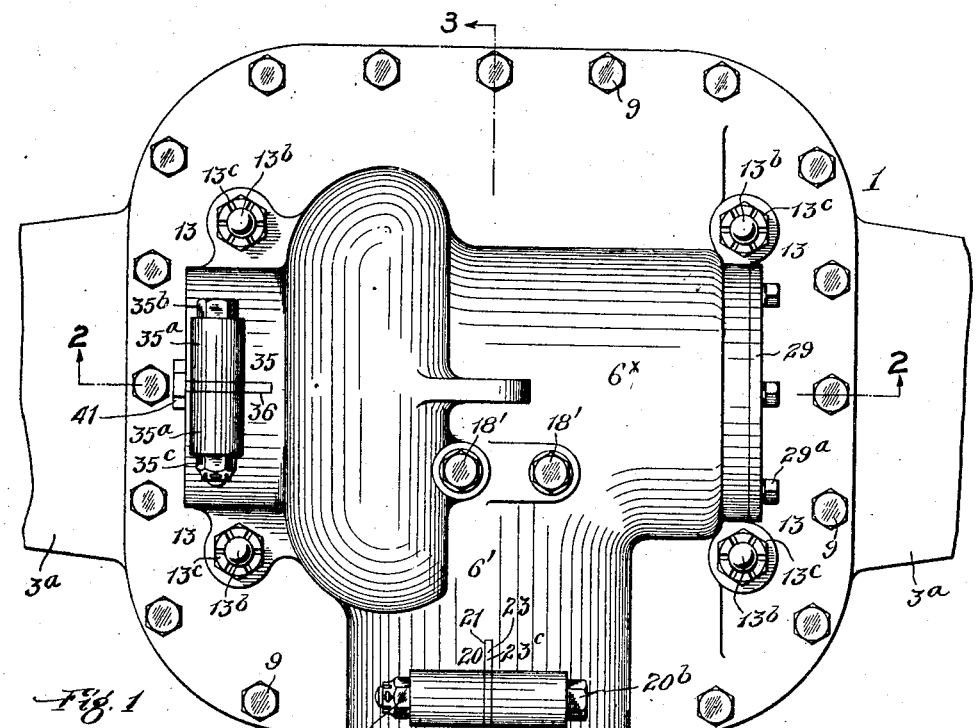
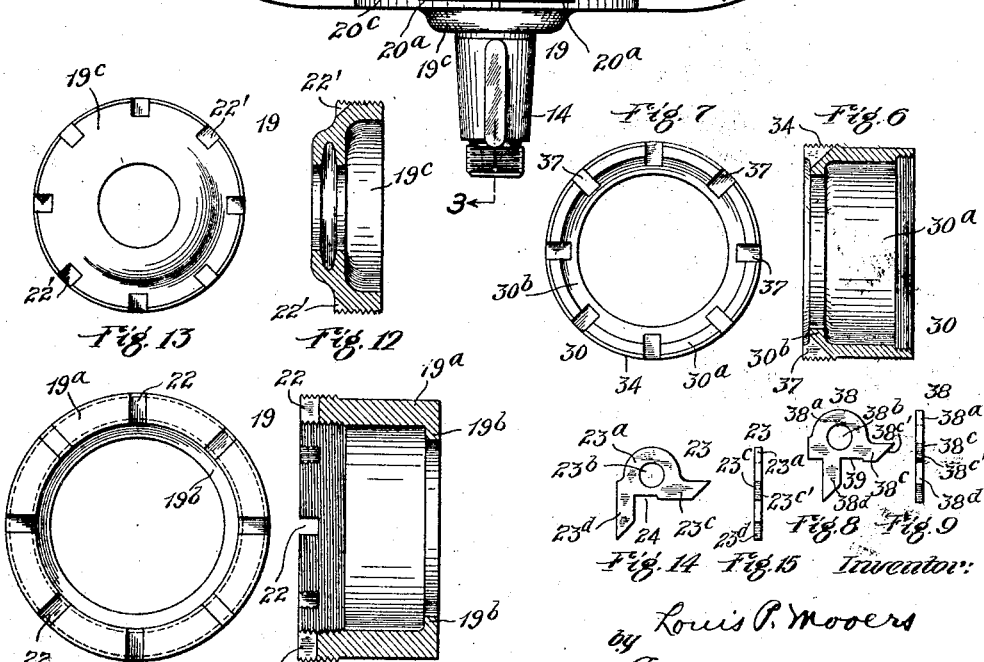
Inventor:
Louis P. Mooers
by Edward A. Alexander
Attorney.

Dec. 4, 1923.

L. P. MOOERS 1,476,675

POWER TRANSMITTING MECHANISM

Filed July 12, 1920    4 Sheets-Sheet 3

Inventor:
Louis P. Mooers
by
Edward R. Alexander
Attorney.

Patented Dec. 4, 1923.

1,476,675

UNITED STATES PATENT OFFICE.

LOUIS P. MOOERS, OF CINCINNATI, OHIO.

POWER-TRANSMITTING MECHANISM.

Application filed July 12, 1920. Serial No. 395,588.

*To all whom it may concern:*

Be it known that I, LOUIS P. MOOERS, a citizen of the United States, residing at Cincinnati, in the county of Hamilton and State of Ohio, have invented certain new and useful Improvements in and Relating to Power-Transmitting Mechanism, of which the following is a specification.

This invention relates to a power transmitting mechanism particularly to a power transmitting mechanism for self-driven vehicles.

One object of the invention is to provide a relatively simple power transmitting mechanism the elements of which may be readily assembled, removed and adjusted.

Another object of the invention is to provide a mounting or support, whereby the power transmitting mechanism, including the differential and speed reducing elements thereof, can be completely assembled, positioned and removed as a unit.

A further object of the invention is to provide novel forms of adjusting devices for the shafts of certain of the power transmitting elements.

Other objects of the invention will be apparent to those skilled in the art to which my invention relates by reference to the accompanying drawings taken in connection with the following description.

For the purpose of illustration, I have, in the accompanying drawings, shown and herein described one form of apparatus embodying my invention.

In the drawings, Fig. 1 is a plan view of a driving mechanism embodying my invention.

Figs. 6, 7, 8 and 9 are details of the adjusting elements for the intermediate shaft.

Figs. 10, 11, 12, 13, 14, 15 are detail views of the adjusting elements for the driving shaft.

Figure 2:
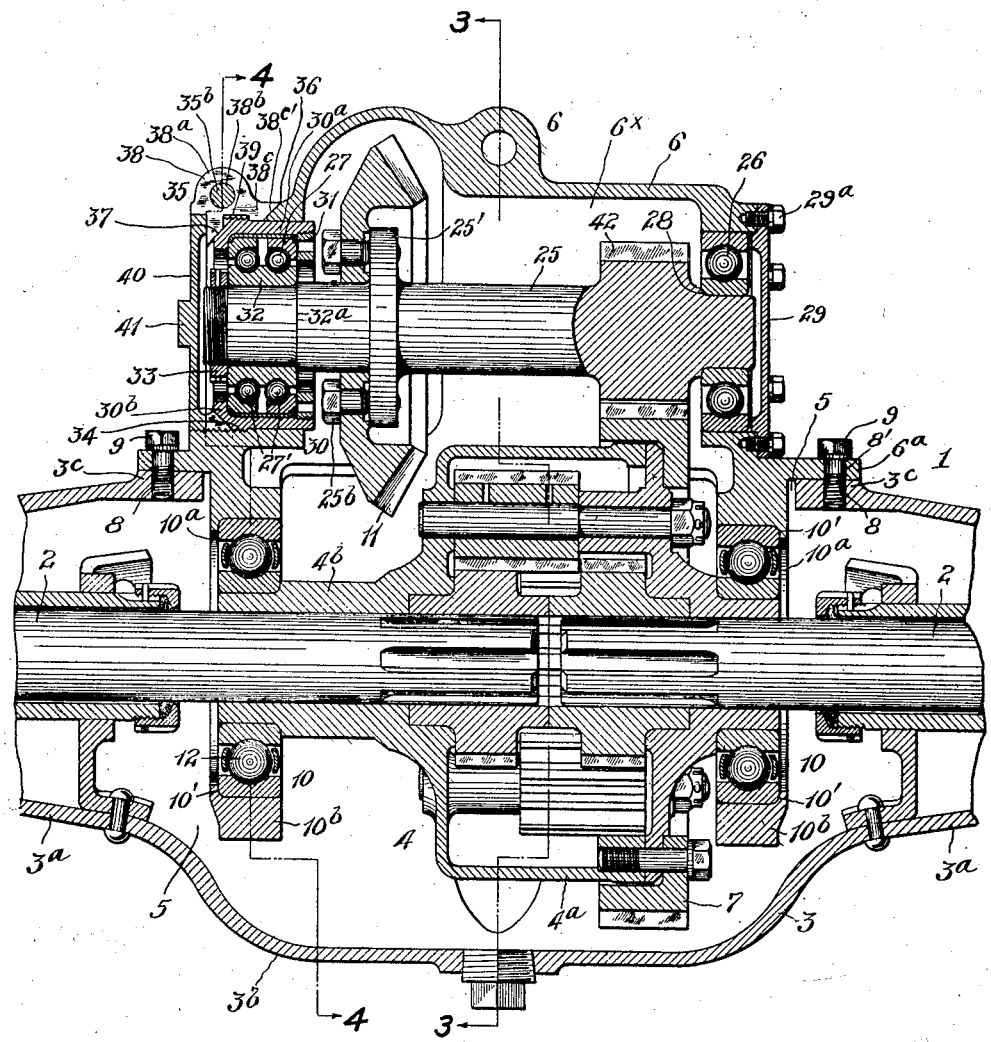
Fig. 2 is a section on the line 2—2 of Fig. 1.

In the drawings, 1 indicates as an entirety the rear axle of a vehicle. The axle preferably comprises a pair of axle sections 2 and a housing 3, which includes tubular members, 3$^a$, 3$^a$, and a wall 3$^b$ connected to the inner ends of the members 3$^a$. The wall 3$^b$ is enlarged and provided with side walls 3$^{b'}$ to provide an enlarged centrally disposed gear receiving section to enclose the differential mechanism, indicated as an entirety at 4. The walls 3$^{b'}$ and members 3$^a$ are shaped and constructed to form a relatively large opening 5 on the upper side of the axle housing to receive the elements of the power transmitting mechanism in the manner hereinafter set forth. As will be understood from Figs. 2 and 3, the upper free edges of the walls 3$^{b'}$ and inner edges of the members 3$^a$ form a seat for an integrally formed cover and gear carrier, indicated as an entirety at 6, for the elements of the power transmitting mechanism. The differential mechanism 4, itself, is preferably substantially similar in construction to the differential mechanism shown in my reissued Letters Patent No. 12,966, except that in my present construction I provide the drum or housing member 4$^a$ with a spur gear 7, as shown in Fig. 2.

As shown in the drawings, the cover and gear carrier 6 is constructed and shaped for co-operation with the members 3$^a$ and walls 3$^b$, 3$^{b'}$, and to enclose certain of the power transmitting mechanism elements, as well as support them. For this purpose, the walls of the cover 6 are shaped to provide chambers 6', 6$^x$, preferably arranged at right angles to each other, to receive certain elements of the power transmitting mechanism, as will be later described.

Figures 3, 5:
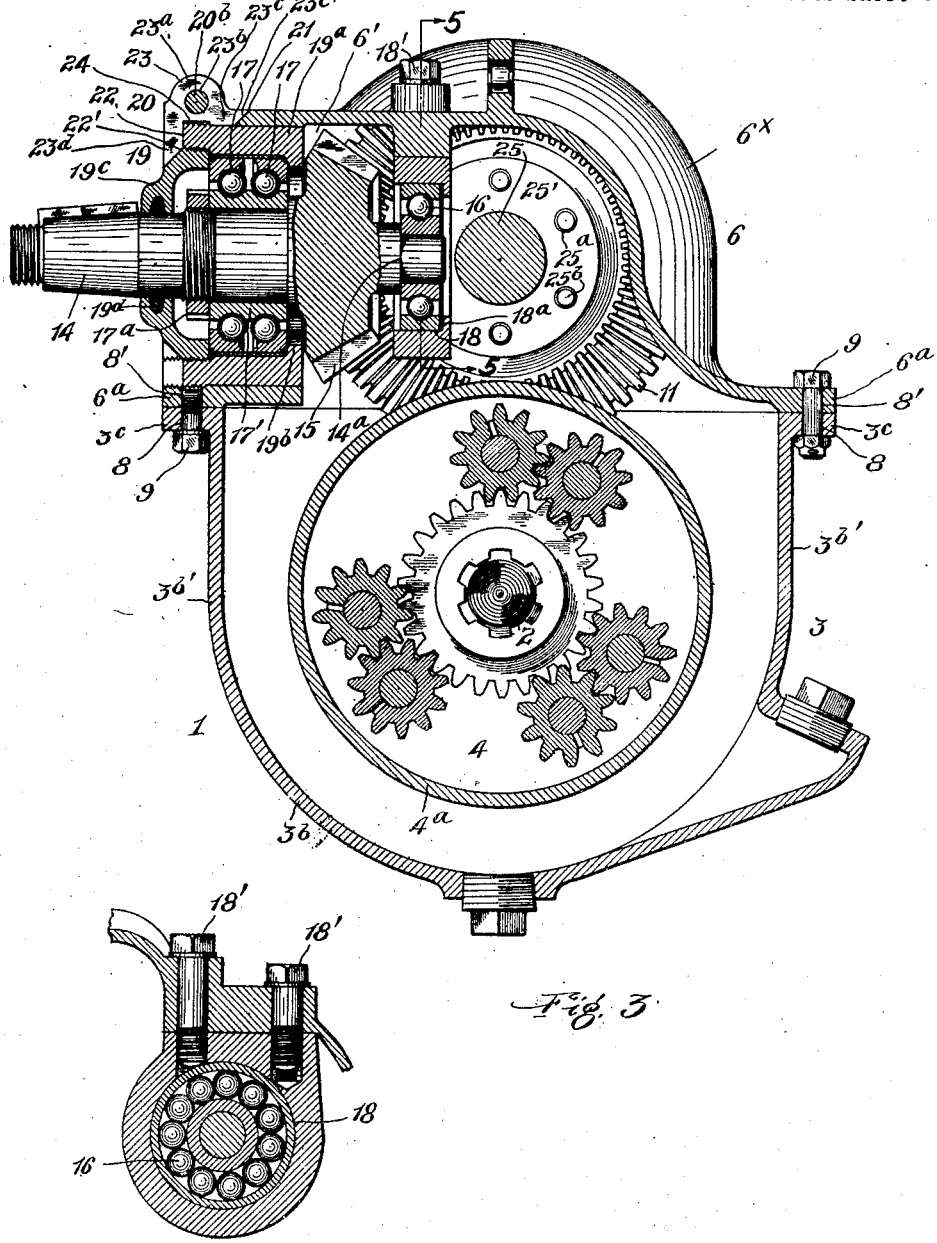
Fig. 3 is a section on the line 3—3 of Figs. 1 and 2, looking toward the left.
Fig. 5 is a section on the line 5—5 of Fig. 3.
Figure 4:
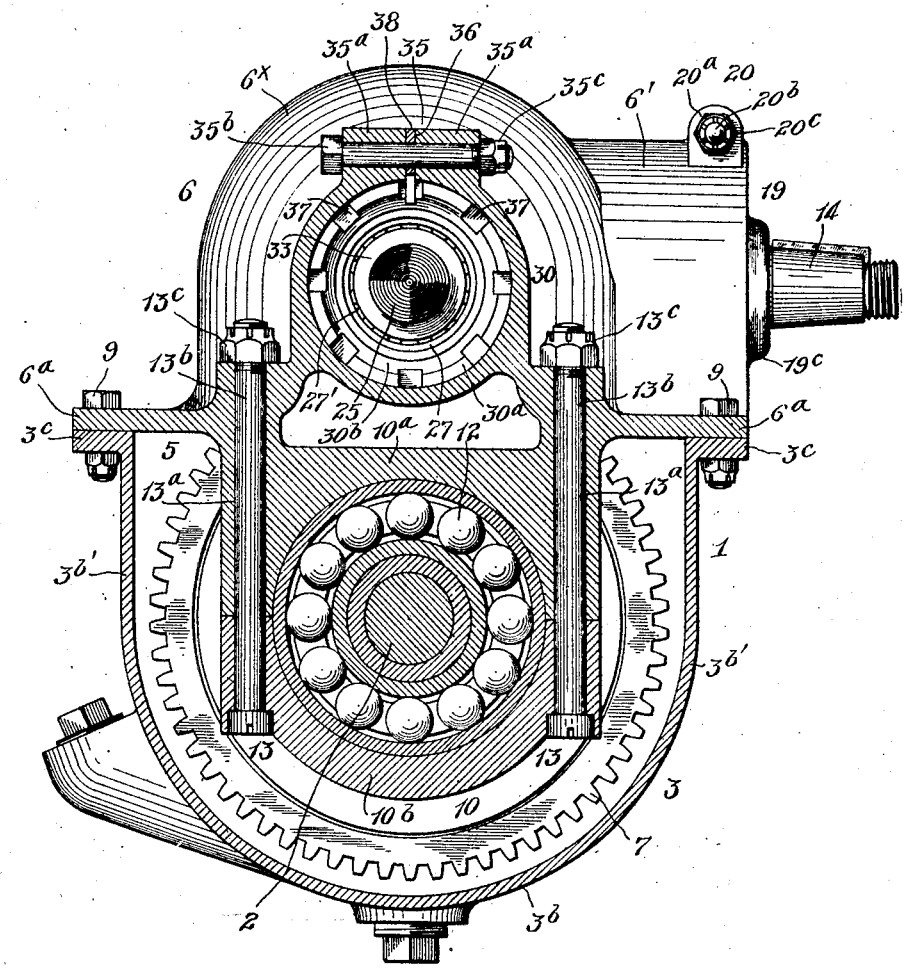
Fig. 4 is a section on the line 4—4 of Fig. 2 looking toward the right.

Referring to the cover 6, 6$^a$ indicates a wall or flange adapted to engage the seat formed by the walls 3$^{b'}$ and members 3$^a$. The walls 3$^{b'}$ may be provided with flanges 3$^c$. The flanges 3$^c$ and free edges of the members 3$^a$ are preferably formed with openings 8 which register with openings 8' formed in the flange 6$^a$. 9 indicates devices, such as cap screws and bolts, extending through the openings 8, 8', and securing the cover and gear carrier 6 to the walls 3$^{b'}$ and members 3$^a$. 10 indicates devices for supporting the differential housing member 4$^a$. The devices depend from the cover 6 and are suitably spaced from each other to accommodate and permit free operation of a driven gear 11, to be later referred to. Each device 10 preferably comprises bearing blocks 10$^a$ and bearing caps 10$^b$, adapted to support between them annular ball bearings 12, to the inner race of each of which the adjacent tubular extension 4ᵇ of the housing member 4ᵃ is connected in a well known manner. The members 10ᵃ, 10ᵇ, are preferably recessed to form an annular shoulder 10′ against which the outer race fits. As shown, the axle sections 2 extend into and through the tubular extensions 4ᵇ, and are therefore supported by the bearings 12. The bearing block 10ᵃ of each bearing supporting device 10 is integrally formed with the cover 6 (see Fig. 4) and the bearing cap 10ᵇ is connected to the member 10ᵃ by means indicated as an entirety at 13. The connecting means 13 preferably comprise openings 13ᵃ formed in the walls of the cover 6, block 10ᵃ and cap 10ᵇ and bolts 13ᵇ extending through these openings and provided with nuts 13ᶜ on the outside of the cover 6 to secure the bolts in position (see Fig. 4). 14 indicates a propeller shaft mounted in the chamber 6′ and provided with a bevel gear 15 (preferably formed integral with it) adapted to mesh with the gear 11. The shaft 14 is supported at its inner end upon one side of the gear 15 by an anti-friction load bearing 16 and upon the other side of the gear 15 by a pair of bearings 17 preferably adapted to take thrusts in opposite directions. The load bearing 16 is preferably supported in an annular seat member 18 connected to the walls of the chamber 6′ and cover 6 by a pair of cap screws 18′, as shown in Fig. 5. The bearing may rest against a shoulder 18ᵃ formed on the seat member 18, it being held in such position by a shoulder 14ᵃ formed on the shaft 14.

19 indicates as an entirety the mounting or support for the thrust bearings 17. Of this mounting, 19ᵃ indicates an annular member forming a seat for the outer races of the bearings 17. 19ᵇ indicates an inturned flange provided on the inner end of the seat member 19ᵃ and serving as a shoulder for the adjacent outer race. The seat member 19ᵃ is of a size to fit snugly within the open end of the chamber 6′. It is provided with screw threads engaging screw threads provided on the inner walls of the chamber 6′, whereby the seat member 19ᵃ can be secured therein and adjusted to proper position. 19ᶜ indicates an abutment member fitting within and adjustably secured, preferably by means of screw threads, to the open end of the seat member 19ᵃ and adapted to engage the adjacent outer bearing race. The inner races of the bearings 17 are preferably formed in a collar 17′ fitting against a shoulder formed on the shaft 14 and held in such position by a nut 17ᵃ engaging screw threads on the shaft 14. The abutment member 19ᶜ may be constructed to entirely close the space between the shaft and seat member 19ᵃ to protect the bearings 17, as shown in Fig. 3. To insure dust-proof conditions and the non-escape of the lubricant for the bearings 17, the wall of the abutment member surrounding the shaft 14 is preferably recessed to receive a gasket 19ᵇ.

20 indicates as an entirety means for locking the seat member 19ᵃ and abutment member 19ᶜ in position and in fixed relation to each other. Of these means, 20ᵃ indicates a pair of spaced lugs formed integrally with the upper side of the walls forming the chamber 6′. The lugs 20ᵃ are formed with aligned openings to receive a clamping bolt 20ᵇ, held in position by a nut 20ᶜ. The wall of the chamber 6′ is slotted at 21 to permit the lugs to be moved slightly toward each other when the bolt 20ᵇ and nut 20ᶜ are tightened. The end wall of the slot 21 is preferably inclined (see Fig. 3) for a purpose to be presently set forth. 22, 22′ indicate a plurality of slots or notches formed in the walls of the seat member 19ᵃ and abutment member 19ᶜ, respectively. The slots or notches in each of said members are preferably uniformly spaced from each other and so arranged that the slots or notches in one member can register with the slots or notches in the other member. 23 indicates a key arranged to form an interlock between the wall of the chamber 6′ and the members 19ᵃ, 19ᶜ. The key 23 is of suitable size to fit between the lugs 20ᵃ and to be clamped thereby when the bolt 20ᵇ and nut 20ᶜ are tightened. The key preferably comprises a body portion 23ᵃ formed with an opening 23ᵇ through which the bolt 20ᵇ passes and arms 23ᶜ, 23ᵈ, preferably arranged at right angles to each other. The rear end of the arm 23ᶜ is inclined, as shown at 23ᶜ′ (see Fig. 3) to engage the inclined end wall of the slot 21. The arm 23ᵈ extends downwardly and projects into the adjacent slots or notches 22, 22′, formed in the members 19ᵃ, 19ᶜ, to lock the latter in position and in fixed relation to each other. At 24, the key 23 may be cut away to accommodate the screw threads on the other surface of the seat member 19ᵃ.

25 indicates an intermediate or countershaft extending through the chamber 6ˣ and arranged to support the gear 11. The opposite ends of the shaft 25 are supported in suitable anti-friction bearings 26, 27, mounted within the walls of said chamber. As shown the chamber 6ˣ is open at its opposite ends and the bearings 26, 27, are arranged at or in close proximity to these open ends so as to permit ready access thereto. The shaft 25 may be provided with a collar 25′ and the latter may be formed with a plurality of screw threaded openings 25ᵃ. The gear 11 is rigidly secured to the collar 25′ by a plurality of cap screws 25ᵇ which extend through openings formed in the gear 11 and engage the screw threads of the openings 25ᵃ (see Fig. 3).

The bearing 26 is a load bearing. The inner edge of the inner race of the bearing 26 fits against a shoulder 28 provided on the shaft 25, the outer race fits snugly within the walls of the chamber 6ˣ, but may be held against outward displacement by a closure plate 29, preferably secured to the end walls of the chamber 6ˣ by cap screws 29ª.

The bearings 27 are preferably of a type to take both loads and thrusts; for this purpose I provide two bearings 27′, 27′, whereby thrusts in both directions endwise of the shaft 25 are overcome.

30 indicates as an entirety means for supporting the bearings 27′, 27′, at and within the opposite open end of the chamber 6ˣ. Of these means 30ª indicates a seat member having an inturned flange 30ᵇ at its outer end. The flange 30ᵇ forms a shoulder against which the outer race of the outer bearing 27′ rests. At its inner end, the seat member 30ª is provided with screw threads to adjustably hold in place a ring 31. The ring 31 is arranged to be positioned against the outer race of the inner bearing 27′; by proper adjustment of the ring 31 the outer races of both bearings 27′ can be adjusted. The inner races for the bearings 27′, 27′, are preferably formed integrally, by means of a ring or collar 32, which at its inner end fits against a shoulder 32ª formed on the shaft 25. The ring 32 is held against the shoulder 32ª by a nut 33 engaging suitable screw threads on the outer end of the shaft 25. 34 indicates screw threads provided on the outer surface of the seat member 30ª and arranged to engage screw threads formed on the inner wall of the chamber 6ˣ. These co-operating screw threads permit the seat member 30ª to be secured in proper position and, in co-operation with the bearing 26, support the intermediate shaft. By adjusting the seat member 30ª, as just described, the entire bearing 27 and through it the shaft 25 may be adjusted to position the gear 11 in proper relationship to the gear 15.

35 indicates as an entirety devices for locking the bearing 27 in its adjusted position within the chamber 6ˣ. Of these means, 35ª indicates a pair of spaced lugs formed integrally with the upper side of the wall forming the chamber 6ˣ. The lugs 35ª are formed with aligned openings to receive a clamping bolt 35ᵇ which is held in position by a nut 35ᶜ. The wall of the chamber 6ˣ is slotted at 36 to permit the lugs to be moved slightly toward each other when the bolt 35ᵇ and nut 35ᶜ are tightened. The end wall of the slot 36 is preferably inclined (see Fig. 2) for a purpose to be presently set forth. 37 indicates a plurality of slots or notches formed in the outer wall, and preferably near the outer end of the seat member 30ª. The slots or notches 37 are preferably uniformly spaced from each other, as shown in Fig. 7 of the drawings. 38 indicates a key, arranged to form an interlock between the wall of the chamber 6ˣ and the seat member 30ª. The key 38 is of suitable size to fit between the lugs 35ª and be clamped thereby when the bolt 35ᵇ and nut 35ᶜ are tightened. The key preferably comprises a body portion 38ª formed with an opening 38ᵇ through which the bolt 35ᵇ passes, and arms 38ᶜ and 38ᵈ, preferably arranged at right angles to each other. The rear end of the arm 38ᶜ is inclined as shown at 38ᶜ′ (see Fig. 8) to engage the inclined end wall of the slot 36. The arm 38ᵇ extends downwardly and projects into the adjacent slot or notch 37 formed in the seat member 30ª to lock the latter in position. At 39 the key 38 may be cut away to accommodate the screw threads on the outer surface of the seat member 30ª.

40 indicates a closure plate or cap arranged to close the open end of the chamber 6ˣ adjacent to the bearing 27. This cap is preferably provided with screw threads which engage the screw threads formed on the inner wall of the chamber 6ˣ. The outer surface of the cap 40 may be provided with a projecting lug 41 of polygonal shape to take a suitable tool, whereby it may be easily positioned and removed.

42 indicates a spur pinion fixed to the intermediate shaft 25. The pinion 42 is preferably formed integral with the intermediate shaft 25 and arranged near one end thereof in close proximity to the load bearing 26. The pinion 42 meshes with the spur gear 7 carried by the drum or housing 4ª. To provide for the arrangement just referred to, the spur gear 7 is arranged at or near the adjacent circumferential edge of the drum 4ª. This construction and arrangement also permits the gear 11 to be arranged at or near the opposite end of the intermediate shaft 25 and free of the drum 4ª and in close proximity to the bearing 27. It also permits the use of a gear 11 that is of relatively large size, and to thereby provide a relatively low speed reduction ratio between the propeller shaft 14 and intermediate shaft 25.

From the foregoing description it will be seen that the power transmitting elements between the differential mechanism 4 and the power shaft (not shown) connected with the engine of the vehicle are constructed and arranged to provide for double reduction in speed; it will further be understood that these elements are relatively few in number and are capable of easy assembly, adjustment and removal. Further it will be seen that but two power transmitting shafts are required and that each thereof are supported at opposite ends by anti-friction bearings, one of which is a load bearing and the other of which is capable of taking thrusts in both directions and of adjustment to insure proper co-operative engagement between the gears 11 and 15.

Again, it will be noted that the bearings for the shaft 25 are mounted in openings formed in walls of the casing element 6; and that as the walls of these openings are integrally formed, the bearings are rigidly supported therein and serve to take all thrusts and stresses on the shaft due to the transmission of the power therethrough. In order to remove the shaft 25 with the gears 11 and 42 thereon as a unit, it will be noted that the following is all that is required, assuming that the differential mechanism has first been removed from the cover 6: remove the closure plate 41, then the nut 33, then the supporting means 30 with the bearings 27 intact. This frees the end of the shaft adjacent the gear 11. The closure plate 29 is then removed and after that the bearing 26. The shaft 25 is then free at both ends. It may be pushed endwise in the cover 6 until the end adjacent the gear 11 frees the walls of the opening in the cover for the bearing 27 and then may be withdrawn from the cover.

From the foregoing description it will also be understood that all of the power transmitting and speed reducing elements, including the differential mechanism are supported upon and by a single, integrally formed cover and gear carrier which thereby permits these elements and mechanism to be assembled and adjusted as a unitary structure and positioned within the axle housing to receive the inner ends of the axle sections 2. Again, since the cover and gear carrier are formed integrally and but relatively few power transmitting elements are required, my invention has the advantage of transmitting power of the engine to the rear axle with minimum friction losses.

To those skilled in the art to which this invention relates many alterations in construction and widely differing embodiments and applications of my invention will suggest themselves without departing from the spirit and scope thereof. My disclosures and description herein are purely illustrative and are not intended to be in any sense limiting.

What I claim is:

1. In apparatus of the character described, the combination of an axle housing having an enlarged centrally disposed gear receiving section with an opening through its upper wall, an integrally formed cover and gear carrier for said opening having pairs of aligned openings, the walls of one of which pairs of openings are integrally formed with the cover, a differential mechanism mounted at either end in the walls of one pair of said openings, a countershaft mounted at either end in the walls of the other pair of said openings, being those which are integrally formed with the cover, and disposed parallel to the axis of said differential mechanism, a closure plate for each of said last described openings, reduction gearing between said countershaft and the housing of said differential mechanism, a propeller shaft mounted in said cover at an angle to said countershaft, reduction gearing between said propeller shaft and said countershaft, and means for securing said cover to said axle housing.

2. In apparatus of the character described, the combination of an axle housing having an enlarged centrally disposed gear receiving section with an opening through its upper wall, an integrally formed cover and gear carrier for said opening having pairs of aligned openings, a differential mechanism mounted at either end in the walls of one pair of said opening, a countershaft mounted at either end in the walls of the other pair of said openings, which walls are integrally formed with the cover, and disposed parallel to the axis of said differential mechanism, a closure plate for each of said last described openings, reduction gearing between said countershaft and the housing of said differential mechanism, a propeller shaft mounted in said cover at an angle to said countershaft, reduction gearing between said propeller shaft and said countershaft, and means for securing said cover to said axle housing, said countershaft being endwise shiftable in said cover, so that when said differential mechanism and closure plates are detached from said cover, said countershaft with gears thereon may be removed from or inserted into the cover as a unit.

3. In apparatus of the character described, the combination of an axle housing having an enlarged centrally disposed gear receiving section with an opening through its upper wall, an integrally formed cover and gear carrier for said opening having a pair of opposed depending bearing blocks with bearing caps and a pair of aligned openings through opposite side walls of said cover, the walls of said last described openings being integrally formed with said cover, an anti-friction bearing mounted in each of said bearing blocks, a differential mechanism having a suitable housing mounted at either end in one of said anti-friction bearings, anti-friction bearings mounted in said aligned openings in said side walls of the cover, a closure plate for each of said last described openings, a countershaft mounted at either end in one of said last mentioned anti-friction bearings, reduction gearing between said countershaft and differential housing, a propeller shaft extending through and suitably mounted in said cover, reduction gearing between said propeller shaft and said countershaft, and means for securing said cover to said axle housing.

4. In apparatus of the character described, the combination of an axle housing having an enlarged centrally disposed gear receiving section with an opening through its upper wall, an integrally formed cover and gear carrier for said opening having a pair of opposed depending bearing blocks with bearing caps and a pair of aligned openings through opposite side walls of said cover, the walls of said last described openings being integrally formed with said cover, bolts extending through said bearing caps, bearing blocks and cover, nuts on said bolts on the outside of said cover for securing said cover, bearing block, bolts and bearing caps together, an anti-friction bearing mounted in each of said bearing blocks, a differential mechanism having a suitable housing mounted at either end in one of said anti-friction bearings, anti-friction bearings mounted in said aligned openings in said side walls of the cover, a closure plate for each of said last described openings, a countershaft mounted at either end in one of said last mentioned anti-friction bearings, reduction gearing between said countershaft and differential housing, a propeller shaft extending through and suitably mounted in said cover, reduction gearing between said propeller shaft and said countershaft, and means for securing said cover to said axle housing.

5. In apparatus of the character described, the combination of an axle housing having an enlarged centrally disposed gear receiving section with an opening through its upper wall, an integrally formed cover and gear carrier for said opening having a pair of opposed depending bearing blocks with bearing caps and a pair of aligned openings through opposite side walls of said cover, the walls of said last described openings being integrally formed with said cover, an anti-friction bearing mounted in each of said bearing blocks, a differential mechanism having a suitable housing mounted at either end in one of said anti-friction bearings, anti-friction bearings mounted in said aligned openings in said side walls of the cover, a closure plate for each of said last described openings, a countershaft mounted at either end in one of said last mentioned anti-friction bearings and insertible and withdrawable from said cover by endwise movement through one of said openings a distance sufficient to swing the other end out of the cover, reduction gearing between said countershaft and differential housing, a propeller shaft extending through and suitably mounted in said cover, reduction gearing between said propeller shaft and said countershaft, and means for securing said cover to said axle housing, whereby the removal of said differential mechanism, closure plates and bearings for said countershaft permits the withdrawal of said countershaft with gearing thereon as a unit.

6. In apparatus of the character described, the combination of an axle housing having an enlarged centrally disposed gear receiving section with an opening through its upper wall, an integrally formed cover and gear carrier for said opening having a pair of opposed depending bearing blocks with bearing caps and a pair of aligned openings through opposite side walls of said cover, the walls of said last described openings being integrally formed with said cover, a closure plate for each of said side wall openings, an anti-friction bearing mounted in each of said bearing blocks, a differential mechanism having a suitable housing mounted at either end in one of said anti-friction bearings, anti-friction bearings mounted in said aligned openings in said side walls of the cover, a countershaft mounted at either end in one of said last mentioned anti-friction bearings, reduction gearing between said countershaft and differential housing, a propeller shaft extending through and suitably mounted in said cover, reduction gearing between said propellor shaft and said countershaft, and means for securing said cover to said axle housing, whereby said cover with countershaft, differential mechanism and reduction gearing may be assembled with or disassembled from said axle housing as a unit.

7. In apparatus of the character described, the combination of an axle housing having an enlarged centrally disposed gear receiving section with an opening through its upper wall, an integrally formed cover and gear carrier for said opening having a pair of opposed depending bearing blocks with aligned openings therethrough and a second pair of aligned openings through the opposite side walls of said cover, the walls of said last described openings being integrally formed with said cover, a closure plate for each of said side wall openings, a differential mechanism having a suitable housing mounted at either end in the adjacent bearing block, a countershaft mounted at either end in the integrally formed walls of said opening through the adjacent side wall of said cover, reduction gearing between said countershaft and differential housing, a second gear on said countershaft, a propeller shaft extending through said cover, an anti-friction bearing for the inner end of said propeller shaft, a ring carrying said anti-friction bearing and detachably connected to said cover by means extending through the cover and operable from the outside thereof, a gear on said propeller shaft meshing with said second gear on the countershaft for said propeller shaft, an anti-friction bearing on the outer side of said gear thereon, a ring carrying said last described anti-friction bearing and removably secured in said cover, whereby said propeller shaft with gear, bearings and supporting rings for both said bearings may be inserted into or removed from said cover as a unit.

8. In apparatus of the character described, the combination of an axle housing having an enlarged gear receiving section with an opening through its upper wall, an integral cover and gear carrier removably secured to said housing to close said opening, said cover having a gear receiving chamber and a pair of opposed bearing blocks, bearing caps therefor, bearings carried thereby, a suitable differential mechanism mounted in said bearings, the side walls of said cover being provided with aligned openings, bearings therein, a countershaft mounted in said last described bearings, closure plates for said last named openings, speed reduction gearing between said countershaft and differential mechanism, a propeller shaft carried by and suitably mounted in said cover at an angle to said countershaft, speed reduction gearing between the propeller shaft and said countershaft and enclosed by said cover, and means for removably securing said cover to said axle housing, whereby said cover, countershaft and differential mechanism may be removed as a unit from said axle housing.

9. In apparatus of the character described, the combination of an axle housing having an enlarged gear receiving section with an opening through its upper wall, an integral cover and gear carrier removably secured to said housing to close said opening, the side walls of said cover being formed with aligned openings, the walls of which are integrally formed, bearings located in said openings, a countershaft having gears thereon and mounted at either end in said bearings, closure plates for said openings, said cover having a pair of opposed bearing blocks depending substantially in alignment with said bearings, bearing caps for said blocks, bearings removably carried by said blocks and caps, a suitable differential mounted in said last mentioned bearings, said bearing blocks being sufficiently spaced apart to permit the removal of said countershaft and gears thereon as a unit when said bearings and differential have been removed from said cover, a propeller shaft carried by and suitably mounted in said cover at an angle to said countershaft, speed reduction gearing between said propeller shaft and said countershaft and enclosed by said cover, and speed reduction gearing between said countershaft and enclosed by said cover, and and means for removably securing said cover to said axle housing.

In testimony whereof I affix my signature.

LOUIS P. MOOERS.